United States Patent [19]

Evrard

[11] 4,294,604

[45] Oct. 13, 1981

[54] USE OF SELECTED N-(2,6-DIMETHYLPHENYL)-ALANINE METHYL ESTER COMPOUNDS AS AMMONIUM NITRIFICATION COMPOUNDS

[75] Inventor: Thomas O. Evrard, Little Rock, Ark.

[73] Assignee: Olin Corporation, New Haven, Conn.

[21] Appl. No.: 124,185

[22] Filed: Feb. 25, 1980

[51] Int. Cl.³ ............................................. C05C 11/00
[52] U.S. Cl. .................................. 71/27; 71/64 SC;; 71/106; 71/108
[58] Field of Search ............... 424/251, 266, 285, 300, 424/309, 324; 71/3, 6, 7, 27, 64 C, 64 SC, 1, 106, 108; 260/968, 465 D; 544/344

[56] References Cited

U.S. PATENT DOCUMENTS

| | | | |
|---|---|---|---|
| 4,025,648 | 5/1977 | Hubele | 424/309 |
| 4,046,911 | 9/1977 | Hubele | 424/285 |
| 4,078,112 | 3/1978 | Hawkins | 71/28 |
| 4,093,738 | 6/1978 | Hubele | 424/309 |
| 4,094,990 | 6/1978 | Hubele | 544/334 X |
| 4,151,295 | 4/1979 | Hubele | 424/285 |
| 4,151,299 | 4/1979 | Hubele | 424/309 |

*Primary Examiner*—S. Leon Bashore
*Assistant Examiner*—F. H. Lander
*Attorney, Agent, or Firm*—William A. Simons; Thomas P. O'Day

[57] ABSTRACT

Disclosed is the use of selected N-(2,6-dimethylphenyl)-alanine methyl ester compounds as ammonium nitrification inhibitors. These compounds can be spread upon or mixed with the soil or applied with nitrogen-containing fertilizers to inhibit ammonium nitrification in the soil.

12 Claims, No Drawings

USE OF SELECTED N-(2,6-DIMETHYLPHENYL)-ALANINE METHYL ESTER COMPOUNDS AS AMMONIUM NITRIFICATION COMPOUNDS

BACKGROUND OF THE INVENTION

1. Field of the Invention

The present invention relates to the use of selected N-(2,6-dimethylphenyl)-alanine methyl ester compounds to inhibit the nitrification of ammonium nitrogen present in the soil. Furthermore, the present invention relates to nitrogenous fertilizer compositions which contain at least one of these compounds.

2. Description of the Prior Art

The use of nitrogenous fertilizers (e.g., liquid ammonia, urea, ammonium salts such as ammonium sulfate, ammonium nitrate and ammonium phosphate, and the like) to improve plant nutrition and growth is well known. These nitrogenous fertilizers, upon addition to the soil, form ammonium ions, which act as a suitable nitrogen source for cultivated crops. Specifically, because these ammonium ions are generally adsorbed and retained by clay and decomposing vegetation in the soil, they remain readily available for plant utilization.

However, through the bacterial process of nitrification, ammonium ions are converted to nitrates. Although nitrates are beneficial in some situations, they have, as anions not bound to soil colloids, the undesirable characteristic of being washed or leached away easily by rain or irrigation. Thus, situations where relatively rapid nitrification of the ammonium ions is accompanied by rain or irrigation may cause a great waste of fertilizer.

To be more specific, nitrification is the process whereby ammonium-nitrogen is converted to nitrite-nitrogen and then nitrate-nitrogen. This oxidation is carried out by various microorganisms called nitrifiers as illustrated by the following sequence:

$$NH_4^+ \xrightarrow{\text{Nitrosomonas spp.}} NO_2^- \xrightarrow{\text{Nitrobacter spp.}} NO_3^-$$

The addition of chemical agents to the soil in order to inhibit or suppress the nitrification process and, thus, retain the nitrogen in the cationic ammonium form in the soil is well known. Such chemical agents are generally called nitrification inhibitors. These chemicals are toxic to the microorganism nitrifiers and will slow down or completely block the oxidation of ammonium ions to nitrates in the soil. More specifically, it is known that there are three types of nitrification inhibitors, namely, ammonium nitrification inhibitors; nitrite nitrification inhibitors; and ammonium-nitrite nitrification inhibitors. Ammonium nitrification inhibitors have been found to be the most commercially important of the three types because they have a positive effect, as compared to the other two types, on the nitrogen balance of soils and of many plants. See Sommer, K., Nitrificides, Landwirt. Forsch. Sonderh., Volume 27, pages 64–82 (1972) for a more detailed discussion of these three types of inhibitors.

Separately, N-(2,6-dimethylphenyl)-N-(methoxyacetyl)-alanine methyl ester and N-(2,6-dimethylphenyl)-N-(furan-(2″)-carbonyl)-alanine methyl ester have been disclosed as fungicides. See U.S. Pat. Nos. 4,046,911 and 4,151,299, both of which issued to A. Hubele on Sept. 6, 1977 and Apr. 24, 1979, respectively.

However, these two compounds have never been disclosed until the present invention as being ammonium nitrification inhibitors.

BRIEF SUMMARY OF THE INVENTION

The present invention is directed to a method for inhibiting the nitrification of ammonium-nitrogen in soil which comprises treating the soil with an effective nitrification-inhibiting amount of at least one of the N-(2,6-dimethylphenyl)-alanine methyl ester compounds having the formula:

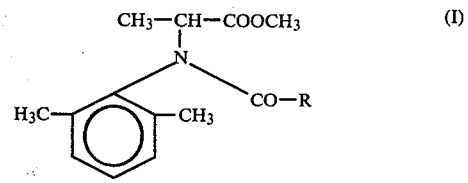

wherein R is selected from the group consisting of:

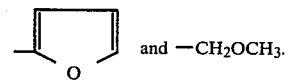 and $-CH_2OCH_3$.

Furthermore, the present invention is directed to, as compositions of matter, nitrogen-containing fertilizers incorporating these alanine derivatives of Formula (I).

DETAILED DESCRIPTION

The compounds of the present invention may be prepared according to the methods disclosed in the above-mentioned U.S. Pat. Nos. 4,046,911 and 4,151,299, both of which are incorporated herein by reference in their entirety. However, these compounds may be made according to other preparative methods and the present invention is not to be limited to any specific method of preparation.

Furthermore, the present invention seeks to encompass the use of all optical isomers of these compounds (i.e., the D-form, the D-L form or the L-form). The D-L form of both compounds was used in the Examples, below.

In practicing the process of the present invention, soil may be treated with an effective nitrification-inhibiting amount of these above-mentioned compounds. It is to be understood that the term "effective nitrification-inhibiting amount" as used in the specification and claims herein is intended to include any amount or concentration that will inhibit or suppress the nitrification of ammonium-nitrogen in the soil and therefore promote desirable plant growth and nutrition therein. Of course, this amount may be constantly changing because of the possible variations of many parameters. Some of these may include the pH of the soil, soil temperature, trace metals and other constituents in the soil, degree of effectiveness required, weather conditions, time of application, amount of fertilizer applied, crops involved and type of carrier, if any. For most uses, an effective nitrification-inhibiting amount would range from about 0.1 to 500 parts per million relative to the soil being treated. Of course, the amount applied should be insufficient to provide toxicity to plants. Usually, a good practice is to add from about 0.1 to about 10 pounds of these compounds to an acre of crop land.

This step of treating soil may be accomplished by applying these compounds into the soil or on its surface by themselves in any conventional manner, or by combining these compounds with an inert carrier or other substance which may enhance the effectiveness of the chemical or facilitate handling. Moreover, the pesticidal and biocidal activity of the present compounds may be broadened by the addition thereto of other known fungicides, herbicides, insecticides, nematocides, biocides and the like.

If the above-mentioned compounds of the present invention are combined with a solid or liquid inert carrier before application, then any known methods for formulating and applying these active compounds may be employed. Included in such known methods are applications in the form of dusts, dust or emulsion concentrates, wettable powders and concentrates, granulates, dispersions, sprays, solutions and the like.

The dusts are usually prepared by simply grinding together from about 1% to 15% by weight of any of these active compounds with a finely divided inert diluent such as walnut flour, diatomaceous earth, fullers earth, attaclay, talc or kaolin. Dust concentrates are made in similar fashion excepting that about 16% to 75% by weight of active compound is ground usually together with the diluent. In practice, dust concentrates are then generally admixed at the site of use with more inert diluent before it is applied to the soil.

Wettable powders are generally prepared in the same manner as dust concentrates, but usually about 1% to 10% by weight of a dispersing agent, for example, an alkali metal lignosulfonate and about 1% to 10% of a surfactant such as non-ionic surfactant, are incorporated in the formulation.

Emulsifiable liquids may be prepared by dissolving the active compound in an organic solvent, such as xylene or acetone, and admixing the thus formed solution with a surfactant or an emulsifier. The emulsified liquid is then generally dispersed in water for spray application to the soil.

Granulates are formulated generally by a method where these active compounds are dissolved in an organic solvent and the resulting solution is then applied to a granulated mineral or the like (e.g., bentonite, $SiO_2$, or the like) followed by evaporating off the organic solvent. Granulates can also be obtained by the compacting of the carrier material with the active substance and then reducing this compacted material in size.

Furthermore, the applied formulations of the present invention include other liquid preparations such as dispersions, sprays or solutions. For these purposes, one or more of the above-mentioned active compounds is normally dissolved in a suitable organic solvent, solvent mixtures or water. As organic solvents, it is possible to use any suitable aliphatic and aromatic hydrocarbon or their derivatives. It is preferred that the solvent be odorless and, moreover, be inert to the active compound.

It should be clearly understood that any of the above-named formulations, the ingredients which may make up such formulations other than the active compounds and their dosages, and means of applying these formulations may include all known and conventional substances, amounts and means, respectively, that are suitable for obtaining the desired nitrification-inhibiting result. Therefore, such process parameters are not critical to the present invention.

Besides the inert solid or liquid carriers mentioned above, the active compounds of the present invention may be employed in combination with a nitrogen-containing fertilizer. Specifically, the present invention encompasses the use of effective nitrification-inhibiting amount of one or more of these active compounds either before or after or simultaneously with one or more nitrogen-containing fertilizers. The term "nitrogen-containing fertilizer" includes any and all known fertilizers that contain nitrogen including ammonia, aqueous ammonia, ammonium hydroxide in solution, ammonium salts such as the sulfate, nitrate and phosphate salts, urea, NPK fertilizers containing one or more ammonium salts and/or urea, and any other materials known to be sources of ammonium ions in soil.

If one or both of the present active compounds are applied to the soil with a nitrogen-containing fertilizer, any conventional method of formulation and fertilizer application may be employed. For example, the active compound may be added to a simple or compound solid fertilizer and ground together to form a homogeneous mixture. Alternatively, the active compound may be sprayed onto the surface of the particulate fertilizer (e.g., urea, ammonium sulfate or ammonium nitrate) to form a coating. Such mixtures of solid fertilizers and active compound may be in the form of solid powders, crystals, pills, granules and the like. If the active compound is added to a liquid fertilizer like liquid ammonia, then simply dissolving the compound in the fertilizer may suffice. The effective nitrification-inhibiting amount of the active compound will, of course, vary with each fertilizer composition and application. Generally, the employment of the compounds of the present invention may be from about 0.1% to about 25% by weight of the nitrogen content of fertilizer applied to the soil.

Besides the two compounds mentioned above, the present invention also contemplates the use of other similar alanine derivatives as ammonium nitrification inhibitors. More specifically, the present invention contemplates the use of any of the compounds disclosed in U.S. Pat. Nos. 4,025,648; 4,046,911; 4,093,738; 4,094,990; 4,151,229; and 4,151,295, all of which issued to A. Hubele and cover similar types of compounds.

The following examples further illustrate the present invention. All parts and percentages employed therein are by weight unless otherwise indicated.

SOIL SCREEN EVALUATION WITH FINE SAND SOIL FROM TEXAS

Each of compounds 1,2 and 3 (see Table 1) were tested at 1 ppm active ingredient concentration. A control experiment was also carried out without any nitrification inhibitor present. Compounds 1 and 2 (i.e., those of the present invention) were formulated as wettable powders and were weighed directly into 20 grams of fine sand soil from Texas (see Table 2 for analysis). A stock solution of compound 3 was made in ethanol and a test volume (0.1 milliliter) was delivered to the same amount of Texas soil via microliter syringe and the soil was then mixed. To each of these three soil mixtures was added 3.9 milliliters of an aqueous ammonium sulfate solution which contained 3.984 grams of ammonium sulfate per liter of solution. The soil mixtures contained 1 part per million by weight of active compound, 200 parts per million ammonia concentration, and were saturated with water to 60% by weight of their field holding capacity (i.e., soil capacity to hold water). These mixtures were stirred thoroughly after the above additions and then incubated at 28° C. The caps on the jars holding these soil samples were opened daily to aerate the samples. After the desired incubation period (i.e., 28 days), the soil samples were shaken with 200 milliliters water. The resulting soil and water mixtures were decanted, leaving a sediment behind, and then centrifuged to remove any remaining solids. Two milliliters of each clear solution were pipetted into a 10 milliliter volumetric flask. To these were added 0.3 milliliter of Nessler's Reagent[1] and sufficient water to obtain 10 milliliters of solution. The solution was transferred to a Spectrophotometric 20 cell and the present transmittance read at 420 millimicrons (the peak of the desired complex being observed).

[1] The preparation is taught by J. H. Yoe, "Photometric Chemical Analysis" Volume 1 (Colorimetric Analysis), John Wiley and Sons, New York, NY, 1928, pp 306–309. This reagent is a well-known ammonia identification agent.

The percent transmittance values obtained were read off a standard curve made by adding known ammonium sulfate amounts to blank aqueous soil extracts, which were then used to determine ammonia concentrations. The ammonia concentrations determined were then used to calculate the percent nitrification inhibition using the following formula:

$$\% \text{ Inhibition} = \frac{\text{Change in Control} - \text{Change is Sample}}{\text{Change in Control}} \times 100$$

Change in Control was the difference between the initial ammonia ($NH_{42}{}^+$) concentration[2] and the remaining ammonia concentration[2] determined after 2.8 days of incubation using a blank sample (i.e., without the active compounds 1, 2, and 3).

Change in Sample was the difference between the initial ammonia ($NH_{42}{}^+$) concentration[2] and the remaining ammonia concentration determined after 28 days of incubation using samples containing compounds 1, 2, and 3.

[2] While 200 ppm $NH_4{}^+$ was weighed into each of the soil samples, only 120–130 ppm $NH_4{}^+$ was extractable initially and the values expressed in Table 1 are the extractable values. Thus, these extracted $NH_4{}^+$ values were used for calculating the % Inhibition for these experiments.

The three compounds were so tested in two separate experiments, each made up of two runs. The results are given in Table 1.

TABLE 1

| | Nitrification Inhibition After 28 Days | | | | | |
|---|---|---|---|---|---|---|
| | Experiment No. 1[3] | | | Experiment No. 2 | | |
| Compounds (at 1 ppm) | ppm $NH_4{}^+$ Initial | ppm $NH_4{}^+$ Remaining | Calculated % Inhibition | ppm $NH_4{}^+$ Initial | ppm $NH_4{}^+$ Remaining | Calculated % Inhibition |
| 1. N-(2,6-dimethylphenyl)-N-(furan-(2")-carbonyl)-alanine methyl ester | 126 ± 3 | 57 ± 2 | 42 | 123 ± 0 | 59 ± 3 | 47 |
| 2. N-(2,6-dimethylphenyl)-N-(methoxyacetyl)-alanine methyl ester | 121 ± 2 | 20 ± 1 | 16 | 128 ± 1 | 15.0 ± 2 | 6 |
| 3. 5-ethoxy-3-trichloromethyl-1,2,4-thiadiazole[4] | 119 ± 1 | 45 ± 2 | 37 | 123 ± 2 | 49 ± 1 | 38 |
| Control (no inhibitor employed) | 124 ± 4 | 4 ± 2 | | 124 ± 2 | 4 ± 2 | |

[3] The values in each experiment reflect an average of results of two runs
[4] This compound is a well-known active nitrification inhibitor

TABLE 2

| Soil Description | |
|---|---|
| Location | Texas |
| pH | 7.2 |
| $NO_3$—N(ppm) | 25.0 |
| $NH_3$—N(ppm) | 12.0 |
| P(ppm) | 100.0 |
| K(ppm) | 250.0 |
| Ca(ppm) | 1050 |

TABLE 2-continued

| Soil Description | |
|---|---|
| Location | Texas |
| Mg(ppm) | 90 |
| Al(ppm) | 10 |
| Mn(ppm) | 5 |
| Total Soluble Salts(ppm) | 850 |
| Sand(%) | 89.4 |
| Silt(%) | 7.0 |
| Clay(%) | 3.6 |
| Organic Matter(%) | 1.7 |
| Classification | Fine Sand |
| Field Holding Capacity (milliliters/20 grams) | 6.5 |
| Total Heterotroph Population (organisms/gram) | $4.3 \times 10^6$ |
| Total Ammonia - Oxidizer Population organisms/gram | $1.2 \times 10^4$ |

What is claimed is:

1. A method for inhibiting the nitrification of ammonium-nitrogen in soil which comprises treating the soil with an effective nitrification-inhibiting amount of at least one of the nitrification-inhibiting compounds having the formula:

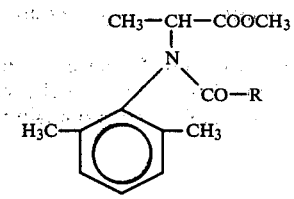

wherein R is selected from the group consisting of:

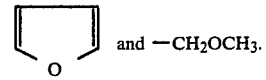 and —$CH_2OCH_3$.

2. The method of claim 1 wherein said nitrification-inhibiting compound has the formula:

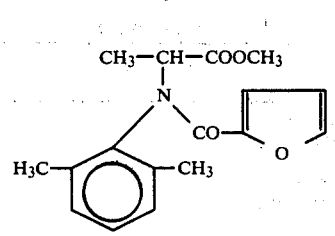

3. The method of claim 1 wherein said nitrification-inhibiting compound has the formula:

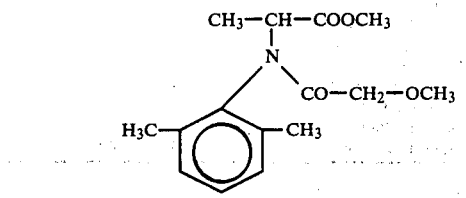

4. The method of claim 1 wherein said treatment of soil by a nitrification-inhibiting compound is in conjunction with the addition of nitrogen-containing fertilizer to said soil.

5. The method of claim 4 wherein said nitrification-inhibiting compound is sprayed on the surface of said soil before the addition of nitrogen-containing fertilizer to said soil.

6. The method of claim 4 wherein said nitrification-inhibiting compound is sprayed on the surface of said soil after the addition of nitrogen-containing fertilizer to said soil.

7. The method of claim 4 wherein said nitrification-inhibiting compound and said fertilizer are added simultaneously to said soil.

8. The method of claim 7 wherein said fertilizer is liquid form.

9. The method of claim 8 wherein said nitrification-inhibiting compound has a formula:

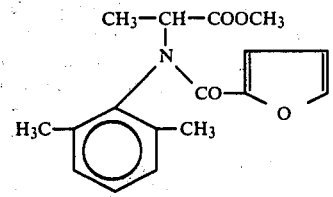

10. The method of claim 9 wherein said fertilizer is liquid ammonia.

11. The method of claim 8 wherein said nitrification-inhibiting compound has the formula:

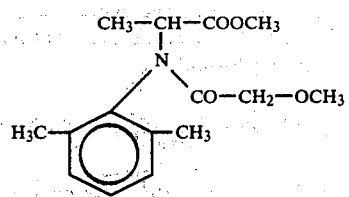

12. The method of claim 11 wherein said fertilizer is liquid ammonia.

* * * * *